Aug. 1, 1933.  W. G. LAIRD  1,920,941
PROCESS FOR RECOVERING GASOLINE AND OTHER HYDROCARBON LIQUIDS FROM NATURAL GAS
Filed Jan. 5, 1927
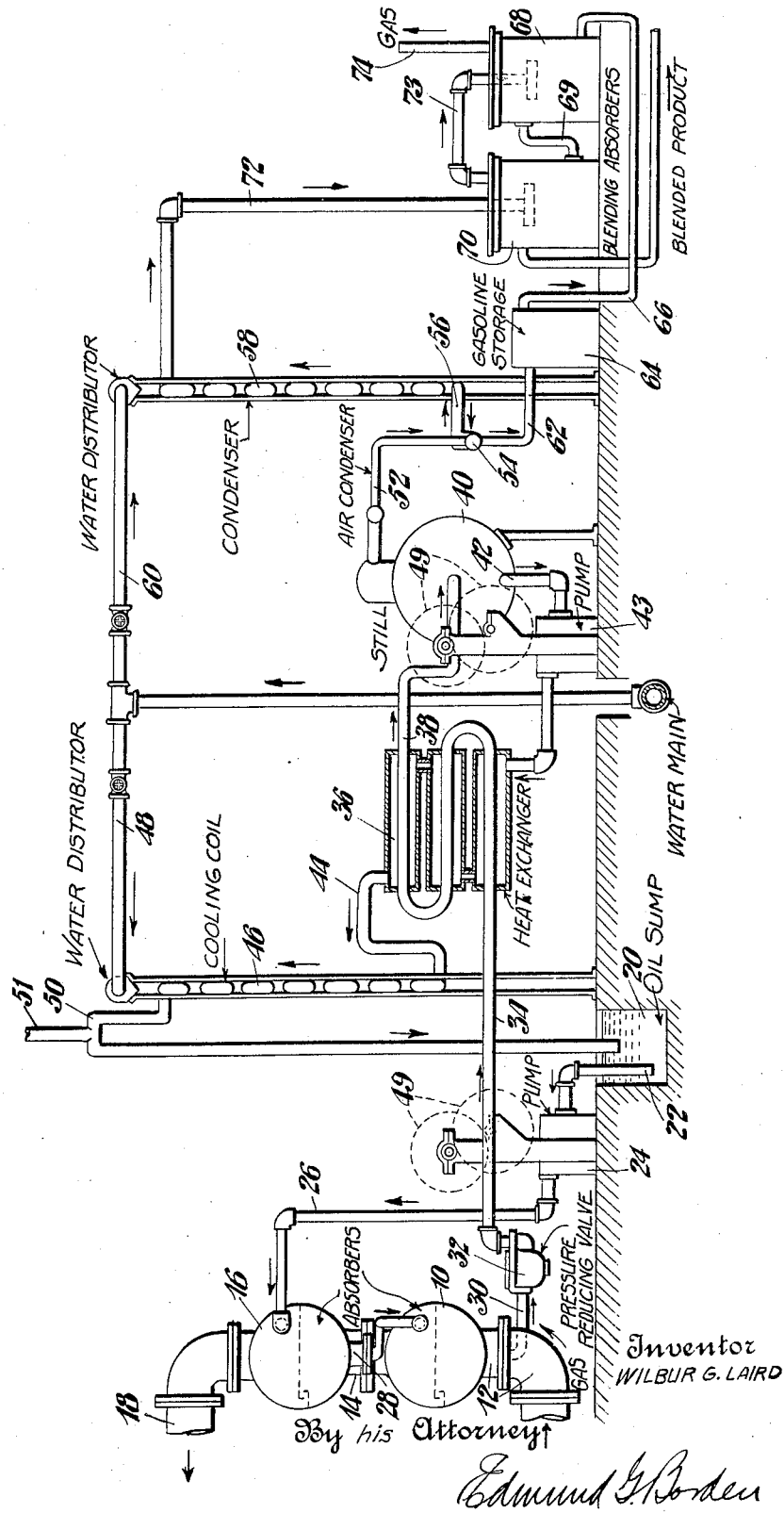
Inventor
WILBUR G. LAIRD
By his Attorney
Edmund G. Borden Patented Aug. 1, 1933

1,920,941

UNITED STATES PATENT OFFICE 1,920,941

PROCESS FOR RECOVERING GASOLINE AND OTHER HYDROCARBON LIQUIDS FROM NATURAL GAS

Wilbur G. Laird, New York, N. Y., assignor to Henry L. Doherty, New York, N. Y.

Application January 5, 1927. Serial No. 159,052

2 Claims. (Cl. 196—8)

This invention relates to a process for recovering gasoline or other hydrocarbon liquids from natural gas by absorption in oil or any suitable absorbent.

In many processes heretofore used for absorbing gasoline from natural gas, the contact between the liquid absorbent and the gas has been obtained by causing the liquid to travel downwardly through a column of coke, brickwork or other porous material and causing the gas to pass upwardly through the column. The purpose of the coke or brick work is to break the liquid into fine streams and thereby increase the surfaces at which absorption takes place. In this type of apparatus, however, it is practically impossible to obtain a uniform distribution of gas and liquid owing to variations in structure in different parts of the coke tower. Moreover, as the liquid is released at the top of the tower its flow through the tower cannot be controlled and it has a tendency to short circuit and form channels through which large streams of liquid flow. The gas also has a tendency to form gas channels or chimneys through which a large part of the gas passes without coming in contact with the liquid. Consequently a high concentration of gasoline or other desired substance in oil or other liquid absorbing medium is difficult or impossible to obtain. Also, with this type of apparatus, it is very difficult to control the absorption of constituents which are present in very small quantities in the gas.

The primary object of the present invention is to provide a process in which a greater and more uniform contact surface between the gas and oil and in which a full control of the flow of gas and oil may be obtained.

Another object of the present invention is to provide a process of absorbing liquid hydrocarbons from gas by which higher concentration and a more complete recovery of the liquid hydrocarbons may be obtained.

A further object of the invention is to provide a process by which the absorbed hydrocarbons may be effectively distilled from the absorbent and recovered in a form suitable for commercial use.

A further object of the invention is to provide a process wherein the hydrocarbons distilled from the absorbent are subjected to a series of rectifying condensing steps so that the heavier or higher boiling hydrocarbons may be separately recovered.

The accompanying drawing shows an apparatus in which may be carried out a process embodying the preferred form of the invention, of which:

The figure is a diagrammatic view in end elevation of an apparatus for recovering gasoline from natural gas.

This application as to common subject matter is a continuation of a pending application for apparatus for recovering gasoline or other hydrocarbon liquids from natural gas, Ser. No. 421,442, filed November 3, 1920, Patent No. 1,666,744 which in turn is a division of an application for process of and apparatus for recovering gasoline or other hydrocarbon liquids from natural gas Ser. No. 306,391 filed June 24, 1919, Patent 1,541,514.

The manner in which the oil vapors of natural gas are absorbed in the apparatus shown in the drawing constitutes an important feature of the present invention. This absorption is effected by causing a thin film of absorbing oil to pass in a horizontal layer across the absorption chamber, and in causing fine streams of gas to pass upwardly through the layer of oil in such a way that the oil will be blown into a fine foam. As this oily foam advances across the absorption chamber additional streams of gas are passed through the foam so that the bubbles are broken up and reformed. In this way the oil is held in the thinnest possible film and this film contacts on both sides with the gas to be treated. This insures that the gas and oil are intimately brought into contact over an enormous area.

The oil to be used as an absorbing medium for the hydrocarbon vapors in the gas will ordinarily be a petroleum oil from which the naphtha and other lighter constituents have been distilled. However, any type of hydrocarbon oil, which is not saturated with naphtha and light hydrocarbons, may be employed, or crude oil itself may be employed in this absorption. Any hydrocarbon vapors present in the gas, which can be maintained in a liquid condition at ordinary temperatures will be absorbed and be later recovered from the oil by distillation with rectification and partial reabsorption to form commercial grades of naphtha, gasoline and other light oils as more specifically pointed out hereinafter.

In treating gases, under high pressure, the apparatus should be as small and compact as possible in order that strength may be obtained without making the walls of the absorber excessively thick. Due to the efficient scrubbing action of the absorbing liquid foam and the consequent short distance of travel of the absorbing liquid it is possible to use a horizontally arranged cylindrical container of comparatively small diameter.

To separate the hydrocarbon vapors from natural gas with the apparatus shown in the drawing, the natural gas under the line pressure enters the bottom of an absorber 10, through a pipe 12, where the gas passes through, and comes in contact with, a layer of absorbing oil to remove the major portion of the hydrocarbons. From the absorber 10 the gas passes through a pipe 14 to a second absorber 16 in which the gas passes through, and comes in contact with a fresh supply of absorbing oil where all of the remaining available hydrocarbon vapors in the gas are absorbed. The gas freed from the hydrocarbon vapors then passes from the absorber 16 through a pipe 18 to a gas main.

The oil to be used as an absorbing liquid is drawn from a sump 20 through a pipe 22, by means of a pump 24 and is forced through a pipe 26 to the absorber 16. Here the oil absorbs the hydrocarbon vapors remaining in the gas after passing through the absorber 10. From the absorber 16 the oil passes through a pipe 28 to the absorber 10 in which it meets a fresh supply of gas and is further saturated with hydrocarbon vapors. The oil from the absorber 10 then passes through a pipe 30 to a pressure reducing float valve 32 which serves to prevent gas from passing through pipe 30. From the valve 32 the oil under a low pressure flows through a pipe 34 into a coil mounted in a heat exchanger 36. In the heat exchanger 36 the oil is heated by hot absorbent oil which has been heated to drive off hydrocarbon vapors previously absorbed. The oil which has been preheated in the heat exchanger 36 then passes through a pipe 38 to a still 40 where it is further heated to drive out the hydrocarbon vapors. From the still 40 the absorbent oil then flows through a pipe 42 to a pump 43 by which it is forced through the heat exchanger 36 where it gives up part of its heat to the oil passing to the still. The cooled absorbent oil then passes through a pipe 44 to be further cooled in a coil 46 which is cooled by a spray of water from the pipe 48. The cold oil is then passed to the sump or storage tank 20 through a pipe 50, provided with a siphon break 51. The pumps 24 and 43 may be operated by any suitable power transmitting mechanism represented diagrammatically at 49.

The hydrocarbon vapors set free from the absorbing oil in the still 40 pass to an air cooled condenser 52 in which the heavy vapors are condensed. The uncondensed vapors from the condenser 52 collect in a manifold 54 and pass through a pipe 56 to a condenser 58 which is cooled by a spray of water from a pipe 60. The condensed vapors from the condensers 52 and 58 collect in the manifold 54 and flow through a pipe 62 to a collecting tank 64. From the tank 64 the condensed vapors may flow through a pipe 66 to a bubbler 68. The condensate rises in the bubbler 68 then overflows through a pipe 69 and passes to a second bubbler 70. Uncondensed vapors from the condenser 58 pass through a pipe 72 and enter the bubbler 70 under the surface of the condensates. The vapor then passes through a pipe 73 into the condensate in the bubbler 68 to remove the last traces of vapor from the uncondensable gas. Hydrocarbon liquids which are not produced in the process may be used in the bubblers 68 and 70 to take up the lighter hydrocarbons which may be absorbed from the uncondensed vapors from the condenser 58 and, if desired, the proper liquid may be used to produce a blended gasoline. Any vapors which are uncondensable under the conditions leave the bubbler 68 through a vent 74 and may be returned to the service main 18.

From the description given above it is apparent that the absorption occurring in chambers 10 and 16 may be carried out under considerable pressures. The pressure used in the pipes 34 and 38 as well as in the still 40 is only sufficient to overcome the liquid head and resistance to flow in this and subsequent parts of the apparatus. The pressure required is mainly that necessary to overcome the pressure head of the liquid in the heat exchanger 36 and the resistance in the condenser 58 where vapors from the still 40 and condenser 52 must pass in counter-flow and in contact with condensate flowing back down this condenser 58. In addition some pressure will be necessary to force light hydrocarbons not condensed in the condenser 58 into the oil to be blended in absorbers 68 and 70.

The vapors leaving the still 40 are composed of the ordinary natural gas hydrocarbons of varying boiling points. These vapors first pass through air cooled condenser 52 where some of the heavier hydrocarbons such, for example, as hexane which boils at 156° F., are condensed. The remaining vapors enter the rectifying condenser 58 which is cooled on the outside with water from the pipe 60. In this condenser the rising vapors constantly enter cooler zones and come into contact with condensate flowing back down the condenser so that certain parts of the vapors are condensed while portions of the condensate are revaporized and again carried up in the condenser.

Because of the fact that the condensation in the upper portion of the condenser 58 is carried out at substantially normal pressure and at the normal temperature of the cooling water (50 to 80° F.), it is evident that hydrocarbons collecting in the header 54 from the condensers 52 and 58 will contain only such hydrocarbons as are condensible under these conditions which, according to the boiling points would include pentane (boiling point 97° F.) and higher boiling hydrocarbons but would not include butane (B. P. 34° F.) or lower hydrocarbons in any substantial amount because of the successive condensations and revaporizations occurring as the vapors from the still advance up the condenser 58. The lighter hydrocarbons leaving the condenser 58 are blended with a suitable oil in the absorbers 68 and 70 to form gasoline so that substantially all of the more valuable constituents taken from the natural gas by the absorbing medium in the absorbers 10 and 16 are converted into commercial products.

As will be recognized by those skilled in the art to which this invention pertains the gasoline collected in the tank 64 will be a relatively stable product in comparison to the gasoline commonly obtained from natural gas. Ordinary natural gas gasoline usually comprises a mixture of both heavy and light hydrocarbons which is difficult to handle and keep in liquid form due to its having a higher vapor pressure than the gasoline obtained by the process described above.

While the process illustrating an embodiment of the invention has been described in connection with the apparatus shown in the drawing it will, nevertheless, be apparent to those familiar with the art of treating natural gas for the recovery of gasoline that the process may be carried out in other apparatus or may be used with existing obsorbing or compressing plants for the recovery of a stable gasoline.

Having thus described my invention, I claim:

1. In the process of producing natural gas gasoline from natural gas, in which hydrocarbons from natural gas are absorbed by means of an absorbing medium, the improvement which comprises effecting the separation of said hydrocarbons from said medium by distillation, passing the vapors so produced through a condensing zone in an air cooled condenser to effect a condensation of a portion of the heavier hydrocarbons, passing the vapors leaving said condenser into a separate condensing zone in an upright condensing unit whereby additional hydrocarbons are condensed, and mixing said condensates to produce said gasoline.

2. In the process of recovering from natural gas a mixture of natural gas hydrocarbons comprising a gasoline relatively stable under ordinary conditions of temperature and pressure and in which the natural gas is subjected to an absorbing medium to absorb hydrocarbons from said gas, the improvement which comprises distilling the absorbed natural gas hydrocarbons from said medium, passing the resulting vapors through a plurality of condensing zones of decreasing temperature in the direction of vapor flow to thereby produce a condensate in each zone, mixing the condensates from said condensing zones to form a relatively stable gasoline mixture, and passing the gas and vapor remaining uncondensed in the last condensing zone in intimate contact with said gasoline mixture to absorb hydrocarbons suitable as a constituent of gasoline from said uncondensed gas and vapor and thereby yield a blended gasoline product.

WILBUR G. LAIRD.